United States Patent
Su et al.

(10) Patent No.: US 11,966,807 B2
(45) Date of Patent: Apr. 23, 2024

(54) MULTI-TAG CONCURRENT IDENTIFICATION METHOD AND SYSTEM FOR QUERY TREE BASED ON FEATURE GROUPS

(71) Applicant: Nanjing University of Information Science and Technology, Nanjing (CN)

(72) Inventors: Jian Su, Nanjing (CN); Jialin Zhou, Nanjing (CN); Wei Zhuang, Nanjing (CN); Ling Tan, Nanjing (CN)

(73) Assignee: Nanjing University of Information Science and Technology, Nanjing (CN)

( * ) Notice: Subject to any disclaimer, the term of this patent is extended or adjusted under 35 U.S.C. 154(b) by 0 days.

(21) Appl. No.: 18/450,021

(22) Filed: Aug. 15, 2023

(65) Prior Publication Data
US 2023/0385569 A1    Nov. 30, 2023

Related U.S. Application Data

(63) Continuation of application No. PCT/CN2022/130245, filed on Nov. 7, 2022.

(30) Foreign Application Priority Data

Nov. 8, 2021    (CN) .......................... 202111309923.1

(51) Int. Cl.
G06K 7/10        (2006.01)
G06F 16/903      (2019.01)

(52) U.S. Cl.
CPC ... G06K 7/10366 (2013.01); G06F 16/90344 (2019.01)

(58) Field of Classification Search
CPC ..................... G06K 7/10366; G06F 16/90344
See application file for complete search history.

(56) References Cited

U.S. PATENT DOCUMENTS

2010/0318536 A1*  12/2010  Bandholz ............ G06F 16/2425
                                                704/251
2016/0239692 A1    8/2016  Lee et al.

FOREIGN PATENT DOCUMENTS

| CN | 103562751 A | 2/2014 |
| CN | 103902942 A | 7/2014 |

(Continued)

OTHER PUBLICATIONS

First Office Action for China Application No. 202111309923.1, dated Mar. 29, 2023.

(Continued)

*Primary Examiner* — Jamara A Franklin
(74) *Attorney, Agent, or Firm* — Piloff Passino & Cosenza LLP; Rachel K. Piloff; Sean A. Passino

(57) ABSTRACT

A multi-tag concurrent identification method and a system for a query tree based on feature groups are provided in this disclosure. In the disclosure, a whole data string space is divided into a plurality of disjoint subsets according to features of data strings returned by tags, where each of the subsets contains several different data strings, each of the data strings in the each of the subsets is regarded as a complete tag ID or a partial ID, and the each of the subsets corresponds to a unique query prefix, a length of the prefix is fixed and does not dynamically increase with an actual location of a collision, and when multiple data strings from a same subset return at a same time, a reader is capable of identifying them at a same time in a slot.

9 Claims, 15 Drawing Sheets

(56) References Cited

FOREIGN PATENT DOCUMENTS

| CN | 104794509 | A  | 7/2015  |
|----|-----------|----|---------|
| CN | 105046181 | A  | 11/2015 |
| CN | 108446577 | A  | 8/2018  |
| CN | 108537079 | A  | 9/2018  |
| CN | 114186571 | A  | 3/2022  |
| KR | 100776532 | B1 | 11/2007 |
| KR | 101521262 | B1 | 6/2015  |
| WO | 2012131461| A1 | 10/2012 |

OTHER PUBLICATIONS

First Search Report for China Application No. 202111309923.1.
Notice to Grant for China Application No. 202111309923.1, dated May 16, 2023.
International Search Report for PCT/CN2022/130245, dated Jan. 18, 2023.

* cited by examiner

IDs of the tag group to be identified

Tag A: 111100111010
Tag B: 111100100110
Tag C: 111100100111
Tag D: 111110101011
Tag E: 111110101100
Tag F: 111110100110
Tag G: 111110101001

FIG. 2

| slot | Probe command | Response | | | | Identification |
|---|---|---|---|---|---|---|
| <1> | Query(ε, 0, ε) | x01x | | | | |
| <2> | QueryRep(ε, 1, x01x) | 0xxx | | | | |
| <3> | QueryR(ε, 0, 0010, 0011, 1010) | 011x | 1010 | | xxxx | Tags B, C, and A are identified |
| <4> | QueryG(ε, 1, 1010) | 0000 | x000 | x0x0 | 0x00 | Tags G, E, F, and D are identified |

FIG. 3

MULTI-TAG CONCURRENT IDENTIFICATION METHOD AND SYSTEM FOR QUERY TREE BASED ON FEATURE GROUPS

CROSS-REFERENCE TO RELATED APPLICATIONS

This application is a continuation of PCT/CN2022/130245, filed on Nov. 7, 2022, and claims priority of Chinese Patent Application No. 202111309923.1, filed on Nov. 8, 2021, the entire contents of which are incorporated herein by reference.

TECHNICAL FIELD

The disclosure relates to a technical field of radio frequency identification (RFID) unknown tag identification in the field of wireless communication, and in particular to a multi-tag concurrent identification method and system for a query tree based on feature groups.

BACKGROUND

Radio frequency identification (RFID) is a wireless communication technology based on backscattering, and is used to automatically identify remote target objects. Now it has been widely used in access control, supply chain management and other fields. A typical RFID system consists of a single reader and multiple low-cost electronic tags with limited energy. Tags are attached to surfaces of many target objects, and each tag has a unique identification (ID). The reader may obtain information of the target object by identifying the tag. The goal of the RFID system is to quickly identify all tags in the working range of the reader. However, since the communication between the tags and the reader is based on the shared wireless channel, when multiple tags return data to the reader at the same time, a multi-tag collision may occur. The multi-tag collision may not only lead to a retransmission of tag data, but also reduce an identification efficiency of the whole RFID system. Therefore, an effective multi-tag anti-collision protocol is very important for the RFID system.

Tag anti-collision may be classified into two categories, namely, a method based on Aloha and a method based on a tree. In the method based on Aloha, the reader queries the tags by sending a query command with a parameter F (F represents the frame length and the number of slots available in a frame). The tag receiving the query command randomly selects a slot in a frame to respond to and returns a 16-bit pseudo-random number (RN16). The reader identifies the state of the slot by decoding the RN16 returned by the tag. For a given slot, it has three states: collision (RN16 returned by multiple tags), idle (RN16 returned by none of tags) and successful (RN16 only returned by one tag). When a frame is over, the reader estimates the number of unidentified tags according to the statistical distribution of slots. The key of the method based on Aloha is to set a reasonable frame length according to the estimated number of unidentified tags. At present, the main shortcomings of the method based on Aloha are: 1) the setting of frame length depends on the estimation accuracy of the number of unidentified tags; with the improvement of the estimation accuracy, the complexity of the method also increases, thus limiting the applicability of the method; 2) there is a tag hunger problem, some tags cannot be correctly identified for a long time; and 3) at present, all methods based on Aloha encounter performance bottlenecks, and their throughput rates cannot exceed 0.368.

The method based on a tree essentially divides the set of colliding tags into smaller subsets until a tag is successfully identified. Generally, the method based on a tree may be further subdivided into a query tree method and a binary split method. The query tree method is a typical memoryless method. The "memoryless" means that the tag does not need to add additional storage space except its own ID. In the query tree method, the reader queries the tags with a query command with a query prefix (binary data string), and those tags whose ID matches the query prefix respond to and return ID data to the reader. Once a collision is detected, the reader adds respectively 0 and 1 to the original query prefix, generates a new query prefix and queries the tags again until all the tags are successfully identified. Most of the existing query tree methods focus on how to reduce collisions, but directly discard the collision information, thus limiting a further improvement of tag recognition performance.

SUMMARY

One of the purposes of the present disclosure is at least to provide a multi-tag concurrent identification method and system for a query tree based on feature groups, which may accelerate the query speed, effectively reduce the query times, improve the query efficiency, reduce the information transmission amount and have stable performance.

In order to achieve the above objectives, the technical scheme adopted by the disclosure includes following aspects.

A multi-tag concurrent identification method for a query tree based on feature groups includes:
dividing a whole data string space into a plurality of disjoint subsets according to features of data strings returned by tags, where each of the subsets contains several different data strings, each of the data strings in the each of the subsets is regarded as a complete tag ID or a partial ID, and the each of the subsets corresponds to a unique query prefix, and a length of the prefix is fixed and does not dynamically increase with an actual location of a collision; when multiple data strings from a same subset return at a same time, a reader is capable of identifying them at a same time in a slot.

A multi-tag concurrent identification system for a query tree based on feature groups includes an electronic equipment and a reader;
the reader is in communication connection with the electronic equipment and used for transmitting or receiving information to tags to be identified in a working area; the electronic equipment includes at least one processor and a memory in communication connection with the at least one processor; the memory stores instructions executable by the at least one processor, and the instructions are executed by the at least one processor to enable the at least one processor to carry out the method.

To sum up, by adopting the technical scheme, the embodiment has at least following beneficial effects:
the whole data string space is divided into a plurality of disjoint subsets by the multi-tag concurrent identification method for the query tree based on feature groups and according to the features of the binary data strings of the tag ID, where each of the subsets contains several different data strings, each of the data strings in the each of the subset is regarded as the complete tag ID or the partial ID, and the each of the subset corresponds to a unique group query prefix, the length of the prefix is fixed and does not dynamically increase with the actual location of the collision; when multiple data strings from a same subset return at the same time, the reader is capable of identifying them at the same time in a slot, thus solving a problem that the conventional method cannot identify the tags in the collision slot, greatly improving the query speed, effectively reducing the query times, improving the query efficiency and reducing the information transmission amount; because the method is capable of directly identifying collision information and has a stable performance, the method is applicable to various tag distribution scenarios.

BRIEF DESCRIPTION OF THE DRAWINGS

FIG. 2 shows IDs of seven tags according to an exemplary embodiment of the present disclosure.

FIG. 3 is a schematic diagram of an interaction process between tags and a reader in the method according to an exemplary embodiment of the present disclosure.

DETAILED DESCRIPTION OF THE EMBODIMENTS

In the following, the disclosure is described in detail with the drawings and embodiments, so as to make the purpose, technical scheme and advantages of the disclosure clearer. It should be understood that the specific embodiments described here are only used to explain the disclosure, and are not used to limit the disclosure.

Figure 1:
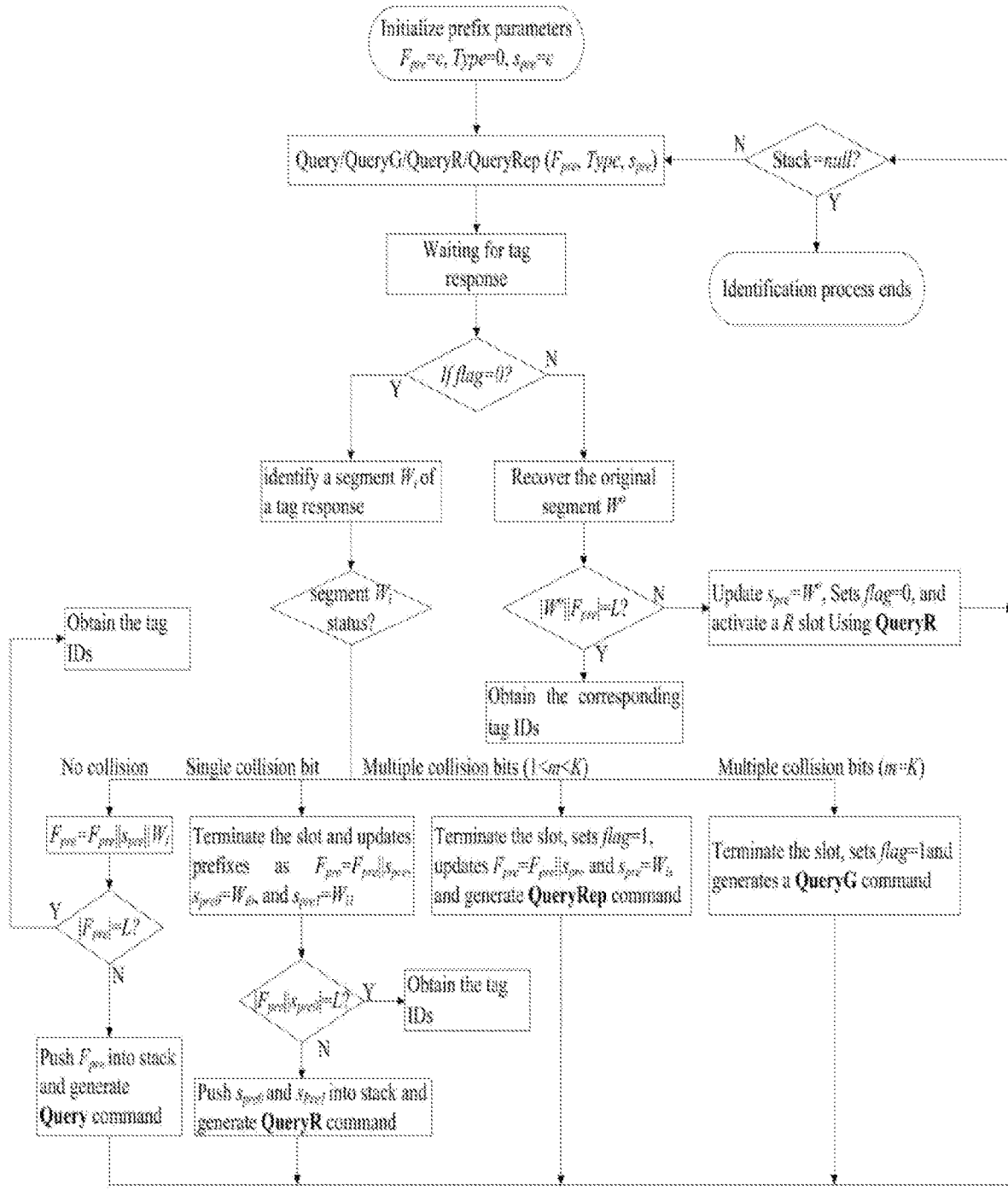
FIG. 1 is a flowchart of a multi-tag concurrent identification method for a query tree based on feature groups according to an exemplary embodiment of the present disclosure.
Figure 4A:
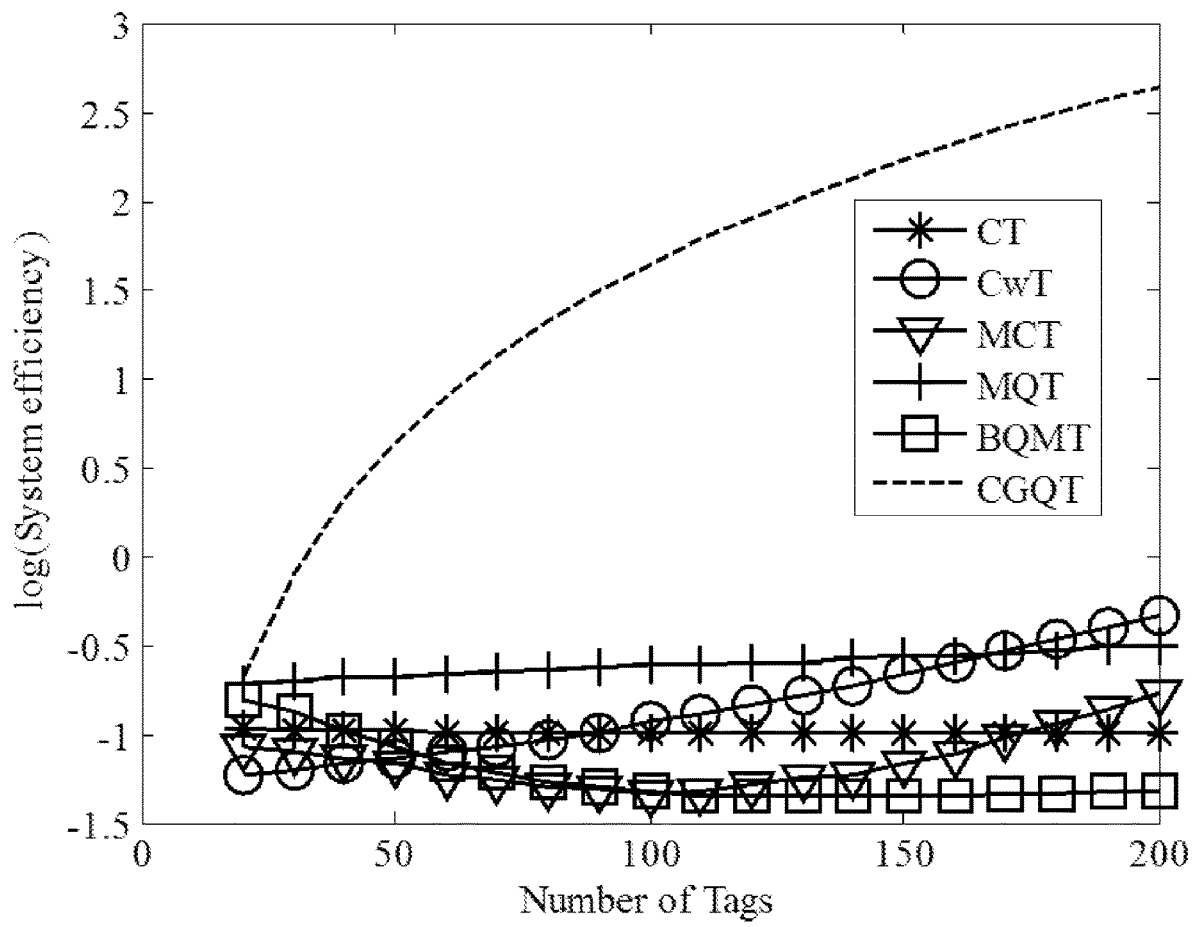
FIG. 4A shows a comparison between a preferred example method of the present disclosure and other advanced anti-collision methods in terms of a system efficiency (the number of tags ranges from 20 to 200).
Figure 4B:
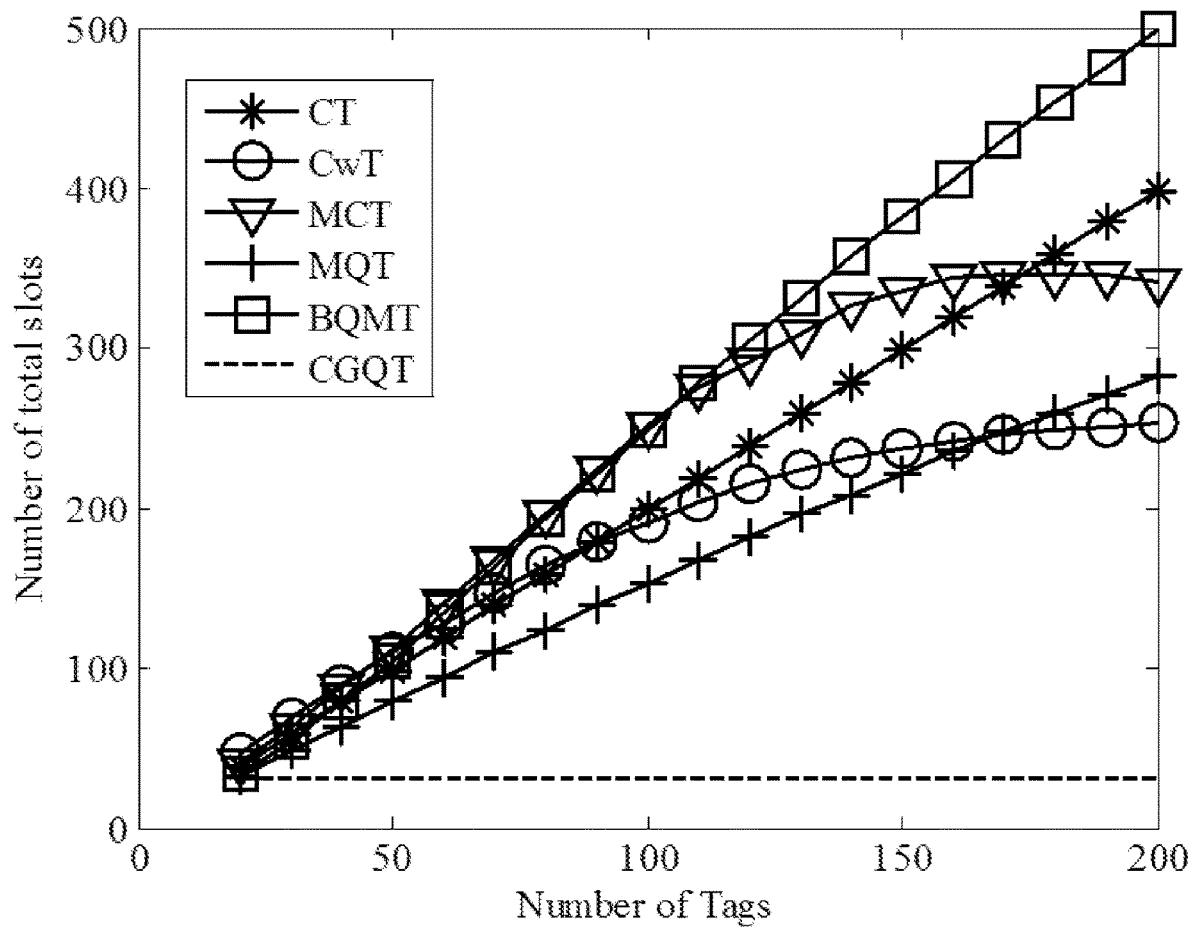
FIG. 4B shows a comparison between the preferred example method of the present disclosure and other advanced anti-collision methods in terms of a number of total slots (the number of tags ranges from 20 to 200).
Figure 4C:
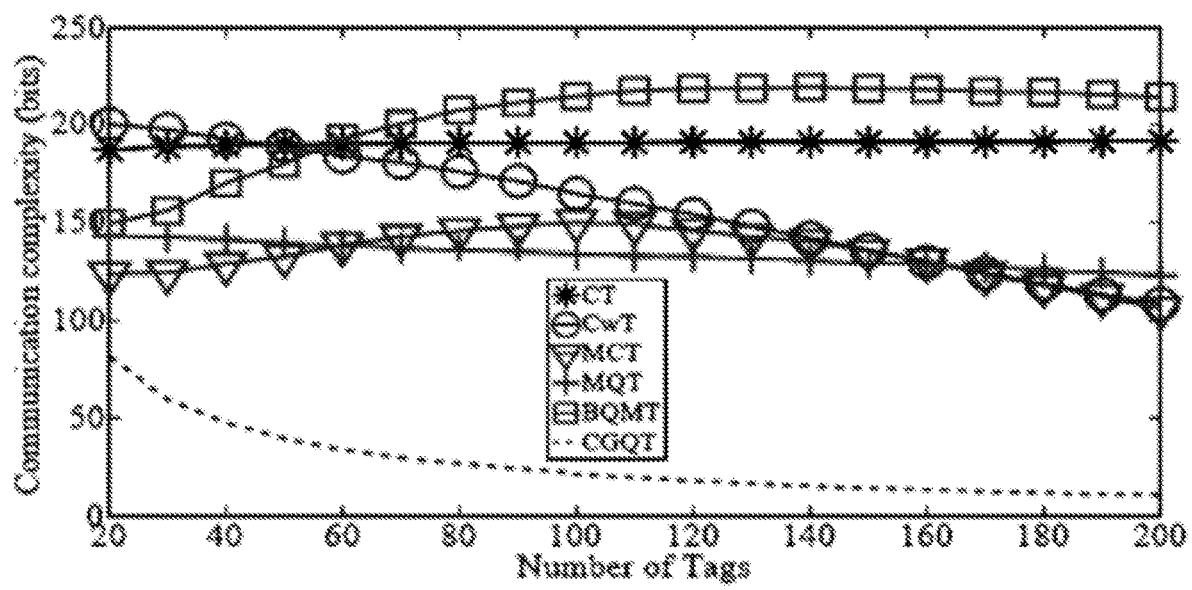
FIG. 4C shows a comparison between a preferred embodiment of the present disclosure and other advanced anti-collision algorithms in terms of a communication complexity (the number of tags ranges from 20 to 200).
Figure 5A:
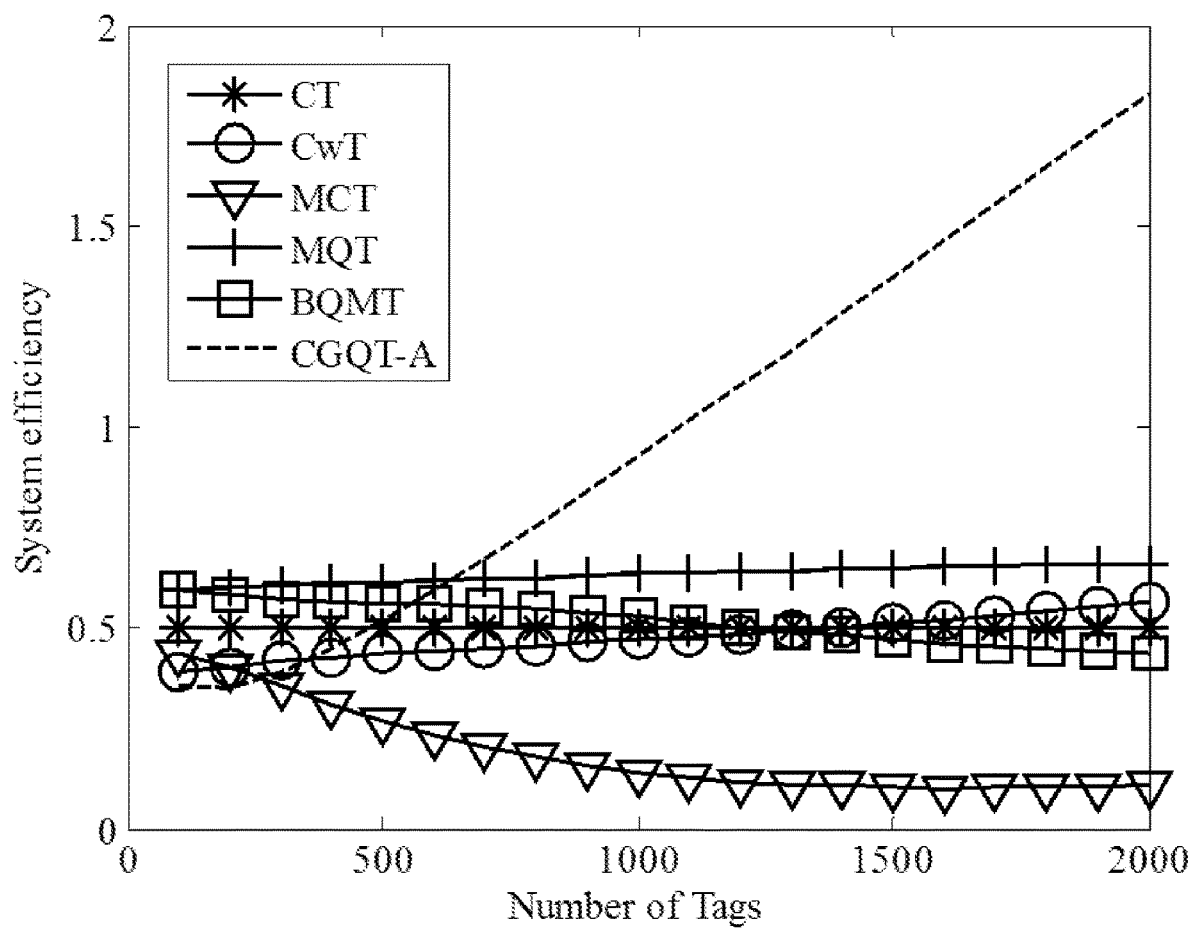
FIG. 5A shows a comparison between the preferred example method of the present invention and other advanced anti-collision methods in terms of the system efficiency (the number of tags ranges from 100 to 2000).
Figure 5B:
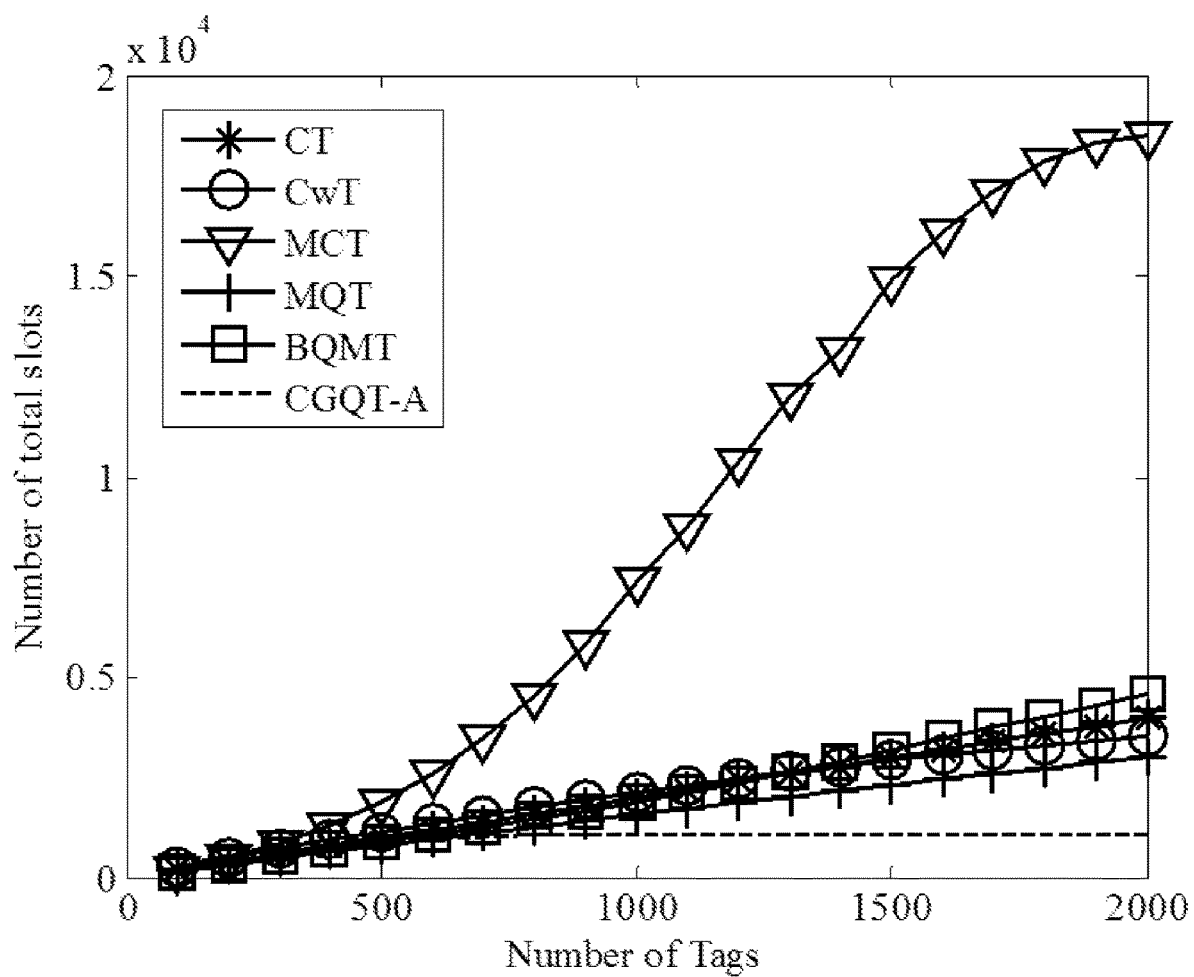
FIG. 5B shows a comparison between the preferred example method of the present invention and other advanced anti-collision methods in terms of the number of total slots (the number of tags ranges from 100 to 2000).
Figure 5C:
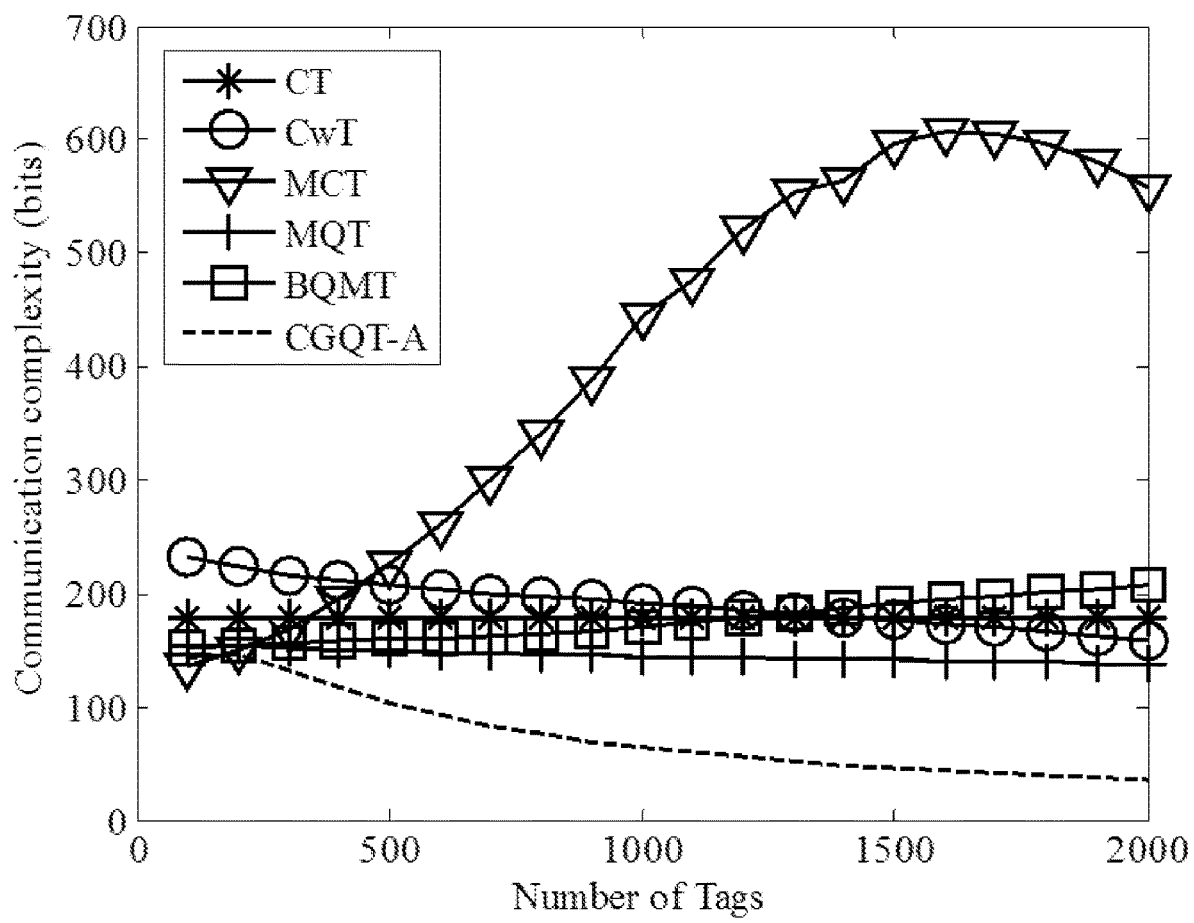
FIG. 5C shows a comparison between the preferred example method of the present invention and other advanced anti-collision methods in terms of the communication complexity (the number of tags ranges from 100 to 2000).
Figure 5D:
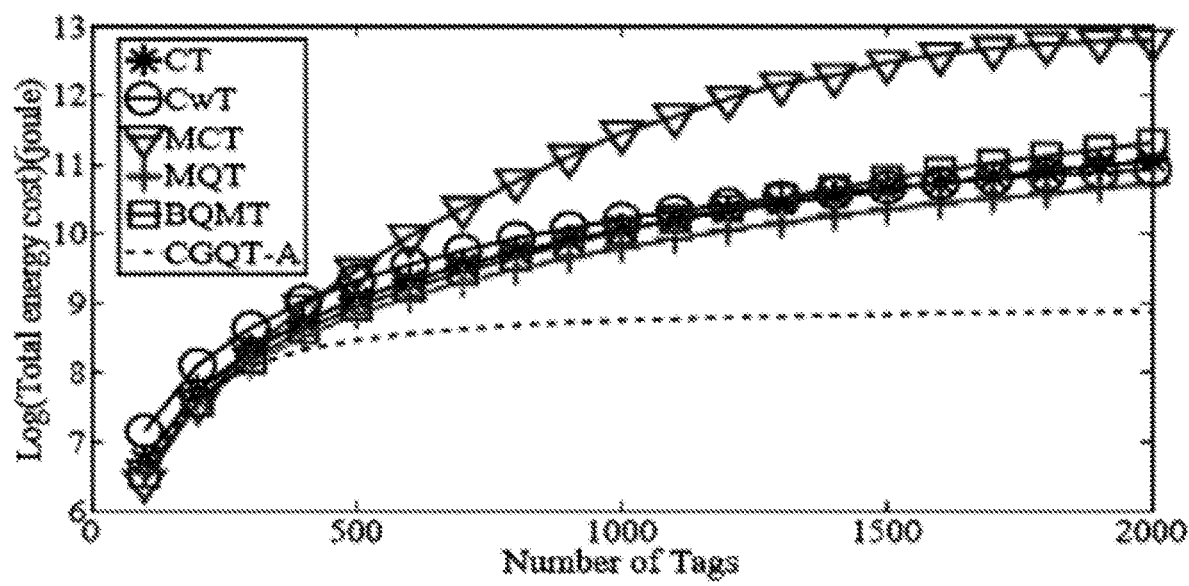
FIG. 5D shows a comparison between the method of the present invention and other advanced anti-collision methods in terms of a total energy cost (the number of tags ranges from 100 to 2000).
Figure 6A:
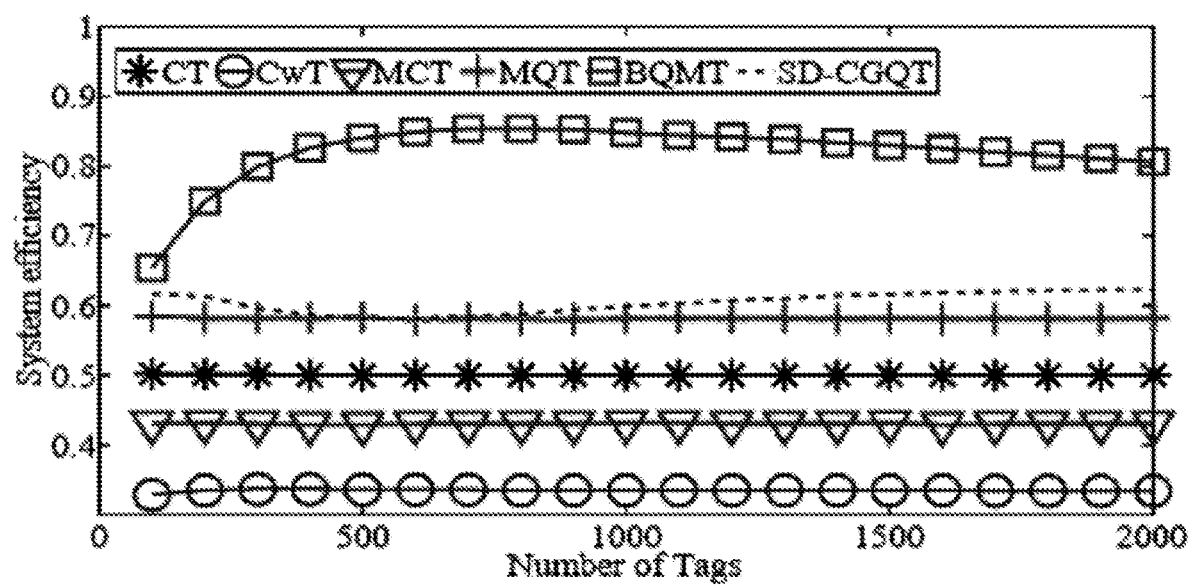
FIG. 6A shows a comparison between the preferred example method of the present invention and other advanced anti-collision methods in terms of the system efficiency (the number of tags ranges from 100 to 2000).
Figure 6B:
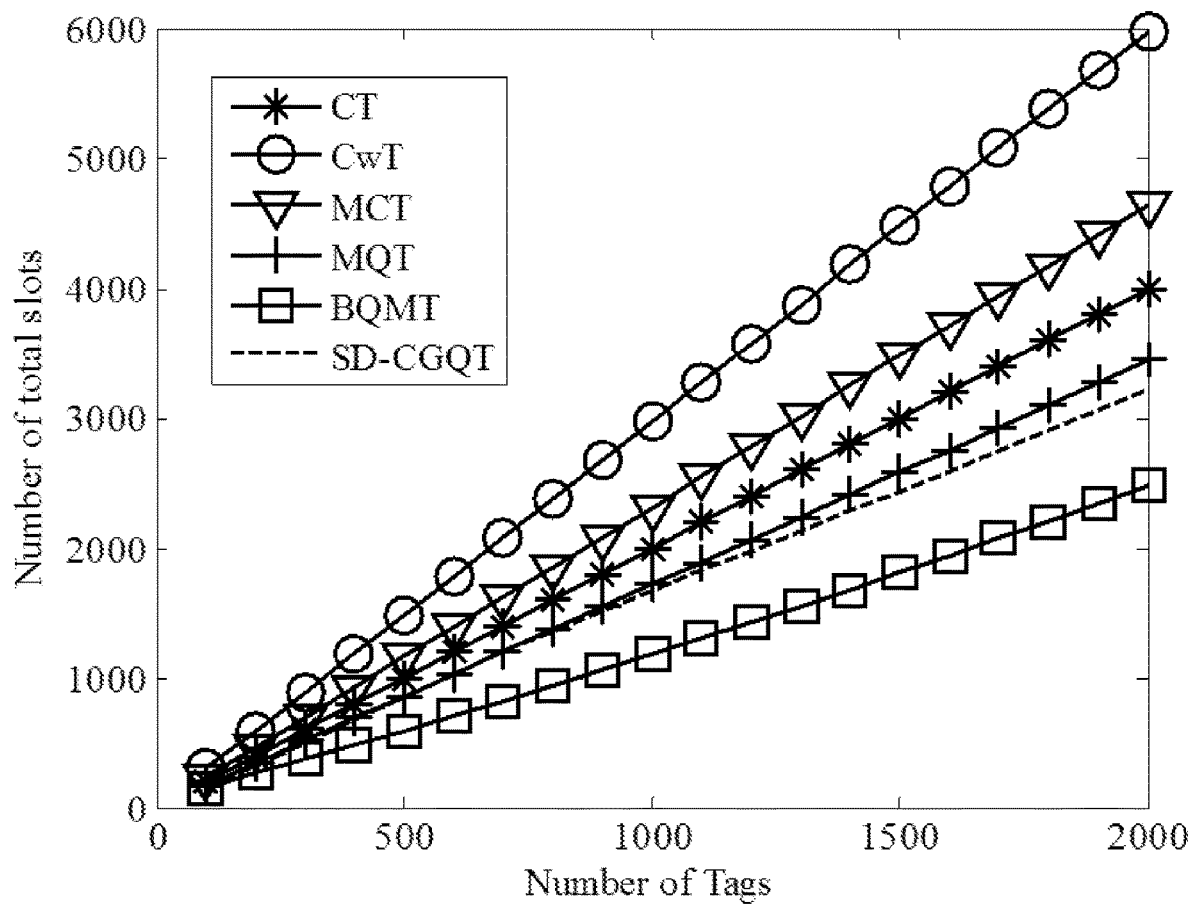
FIG. 6B shows a comparison between the preferred example method of the present invention and other advanced anti-collision methods in terms of the number of total slots (the number of tags ranges from 100 to 2000).
Figure 6C:
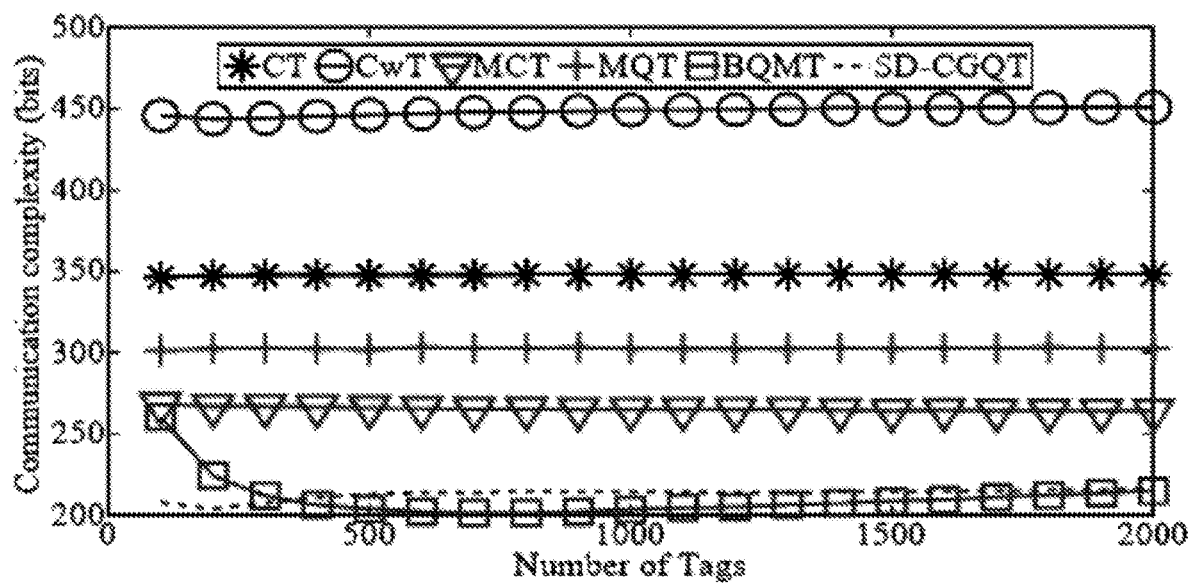
FIG. 6C shows a comparison between the preferred example method of the present invention and other advanced anti-collision methods in terms of the communication complexity (the number of tags ranges from 100 to 2000).
Figure 6D:
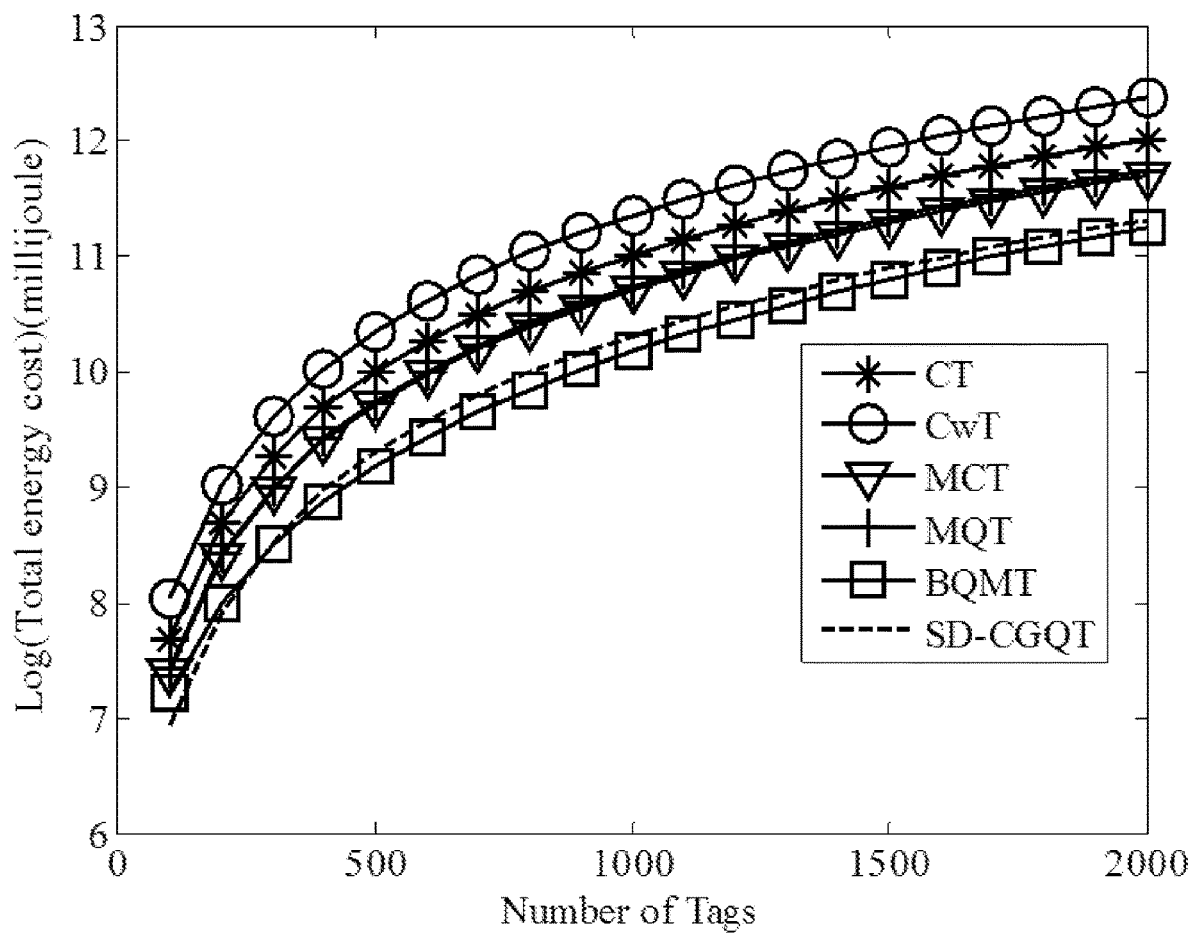
FIG. 6D shows a comparison between the method of the present invention and other advanced anti-collision methods in terms of the total energy cost (the number of tags ranges from 100 to 2000).

FIG. 1 shows a flowchart of a multi-tag concurrent identification method for a query tree based on feature groups according to an exemplary embodiment of the present disclosure. The method of this embodiment mainly includes:

step 1, the reader reads from a stack a frame prefix Fpre (each query command only contains one Fpre parameter), a slot prefix spre (multiple Spre parameters are allowed to exist in the QueryR command) and a flag bit flag, in an initial state, both the frame prefix and the slot prefix are empty strings and the flag bit is 0; and the reader sends query commands of Query, QueryG, QueryR or QueryRep;

step 2, a tag to be identified within a coverage area of the reader receives the query commands sent by the reader, compares the extracted frame prefix Fpre with an own number ID of the tag by using the own matching circuit of the tag, and responds to the query commands of the reader if the extracted frame prefix Fpre is matched with the tag's own number ID, and the response data depends on the flag bit flag, the slot prefix is spre and a command type; when the flag bit is 0, the tag matches first K bits of its own ID with the spre (these K bits of data are collectively referred to segments, and any segment may be represented by $W_i$. Certain segments may be grouped into a feature group, and each feature group corresponds to a group query. Compared with the group query, all the segments in this group are different by only one bit. Through a group query generation method, all group queries and corresponding feature groups may be obtained.). If the matching result is true, the tag returns the matched Wi segment data, if the matching result is not true, the tag waits for a next query command. When the flag bit is 1, the tag matches its ID with the spre, and maps the collision data of $m(1<k<m)$ bits into mapping data of $M=2^m$ bits according to collision position indication information in the spre, and returns the mapping data to the reader; if m=K, the tag generates a $2^K$-bit data string and returns it to the reader;

step 3, the reader receives query responses from the tag; if tag responses are not received within a preset time period T, indicating that there is no tag to be identified within the coverage area of the reader; if the tag responses are received within the preset time period T, a skip is made to a step 4;

step 4, the reader analyzes corresponding tag data according to the different flag bits; if the flag bit is 0, the reader first updates the Fpre to Fpre||spre (A||B represents serial splicing of A and B), and then parses a segment Wi returned by the tag. If the reader does not detect a collision in Wi, updating the Fpre to Fpre‖Wi, setting a query command flag to the Query command, and a skip is made to a step 5; if the reader detects a collision in Wi, a skip is made to a step 6. If the flag bit is 1, a skip is made to a step 7;

step 5, the reader judges whether a length of the Fpre at this moment is equal to a length L of the ID of the tag, and if the length of the Fpre at this moment is equal to the length L of the ID of the tag, a current tag is successfully identified; if the length of the Fpre at this moment is not equal to the length L of the tag ID, the reader pushes updated Fpre and spre parameters into the stack; then a skip is made to the step 1;

step 6, if only 1 bit of collision data is detected in Wi, the reader immediately terminates this slot and replaces the collision bit in Wi with 0 and 1 respectively, and then obtains Wi0 and Wi1; the reader updates Fpre=Fpre‖spre, spre0=Wi0 and spre1=Wi1, and sets the query command flag to QueryR, and a skip is made to the step 5; if m (1<m<K) bits of collision data are detected in Wi, the reader immediately terminates this slot, records a collision position, sets the flag bit to 1, updates Fpre=Fpre‖spre, spre=Wi, sets the query command flag to the QueryRep command, and a skip is made to the step 5; if K bits of collision data are detected in Wi, the reader immediately terminates this slot, sets the flag bit to 1, sets the query command flag to the QueryG command, and a skip is made to the step 1;

step 7: the reader recovers an original segment information W° according to a mapped data string returned by the received tag and the collision information in the spre, and judges whether a length of W°‖spre is equal to the length L of the ID of the tag. If the length of W°‖spre is equal to the length L of the ID of the tag, the reader is capable of identifying the corresponding tag; if the length of W°‖spre is not equal to the length L of the ID of the tag, the reader updates spre=W°, sets the flag bit to 0, sets the query command flag to the QueryR command, and a skip is made to the step 1; and step 8: repeating the above steps until all tags are identified.

Further, a Manchester coding or an FM0 coding are adoptable for an ID coding of the tags.

Further, in the step 1, the Query command is sent for a first time, and the command sent thereafter depends on the query command flag.

Further, in the step 2, a value of K is an integer power of 2.

Further, in the step 2, when 1<m<k, mapping steps of the mapping data returned by the tag specifically include:

step 2.11, inputting m-bit original data, the data is represented as $b=b_{m-1}b_{m-2} \ldots b_0$, and mapped $M(M=2^m)$-bit data is represented as $P=P_{M-1}P_{M-2} \ldots P_0$, where both $b_i$ and $P_i$ represent certain binary numbers. Initializing to make $P_0$-bit in P as 1, rest bits as 0, and j as 0;

step 2.12, calculating $r=b_j \times 2^j$, circularly shifting P to the left by r bits to obtain an updated P, and executing j=j+1; and step 2.13: judging whether a value of j is equal to m, if the value of j is equal to m, ending a mapping process and taking an output of P at this time as a final mapping data; if the value of j is not equal to m, a skip is made to the step 2.12.

Further, in the step 2, specific steps of the group query generation method include:

step 2.21: initializing a group query set $Q_{ini}$ and a K-dimensional vector space $S^K=\{0, 1\}^K$, and vector lengths in the vector space are both K. In the initial state, $Q_{ini}$ is an empty set;

step 2.22: randomly selecting a vector a0 from $S^K$;

step 2.23: selecting a vector a1 from $S^K$ to make a Hamming distance between the a1 and the a0 as 1 (the two vectors only contain one bit 1 after bitwise XOR);

step 2.24: pressing the a0 and the a1 into the set $Q_{ini}$ and removing the a0 and the a1 from $S^K$ at a same time;

step 2.25: judging whether a number of elements in the set $Q_{ini}$ exceeds $N(N=2^K/K)$ at this time, if the number of elements in the set $Q_{ini}$ is greater than or equal to N, ending a group query generation process and outputting $Q_{out}=Q_{ini}$, $Q_{out}$ is a finally generated group query set; if the number of elements in the set $Q_{ini}$ is less than $N(N=2^K/K)$, a skip is made to a step 2.26;

step 2.26: selecting a vector b0 from $S^K$ to make Hamming distances between each vector in the set $Q_{ini}$ and the b0 greater than or equal to 3, and then a skip is made to a step 2.27;

step 2.27: selecting a vector b1 from $S^K$ to make a Hamming distance between the b1 and the b0 equal to 1; and step 2.28: pressing the b0 and the b1 into the set $Q_{ini}$ and removing them from $S^K$ at a same time, and a skip is made to the step 2.25.

Further, in the step 2, when m=K, mapping steps of the mapping data returned by the tag specifically include:

step 2.31: K-bit original data is input, the data is represented as $b=b_{K-1}b_{K-2} \ldots b_0$, and mapped $M(M=2^K)$-bit data is represented as $G=G_1G_2 \ldots G_N$ (where $N=2^K/K$), where b represents a certain binary number and $G_i$ represents a K-bit data string of the i-th segment in G. An initialization is performed to make G as an all-zero data string;

step 2.32: the tag matches its own ID with the spre in the query command, and performs an operation of bitwise XOR on a matched Wi data string and a corresponding group query to generate $G_i$; and step 2.33: the tag replaces a corresponding data string part in G with the generated $G_i$, and remaining data bits in G remain unchanged, and then returns to the reader.

Where the group queries in the step 2 and corresponding feature groups are:

TABLE 1

Examples of group queries and corresponding feature groups (K = 4)

| Group queries | Feature groups |
| --- | --- |
| Q1 = 0000 | G1 = {1000, 0100, 0010, 0001} |
| Q2 = 0001 | G2 = {1001, 0101, 0011, 0000} |
| Q3 = 1110 | G3 = {0110, 1010, 1100, 1111} |
| Q4 = 1111 | G4 = {0111, 1110, 1101, 1011} |

Where a mapping relation table in which the collision data of m(1<k<m) bits in the step 2 is mapped into the mapping data of $M=2^m$ bits is as follows:

TABLE 2

Mapping relation table of collision data
(K = 4, m = 3)

| 3 bits (m = 3) | 8 bits (M = 8) |
|---|---|
| 000 | 00000001 |
| 001 | 00000010 |
| 010 | 00000100 |
| 011 | 00001000 |
| 100 | 00010000 |
| 101 | 00100000 |
| 110 | 01000000 |
| 111 | 10000000 |

3 bits in the Table 2 are information indicating collision bits, and the principle of mapping is to follow the flow of the step 2.11- the step 2.13. For example, b2b1b0=001, and the initial value of p is 00000001. When j=0, r=$b_0$×$2^j$=1, at this time, the P cycle shifts one bit to the left and becomes 00000010. When j=1 and j=2, P remains unchanged, so the value of the final output P is 000000010. Obviously, this method is also capable of being effectively extended to a m-bits mapping to map m-bits data and generate a $2^m$-bit mapping data.

The disclosure is specifically applied to an environment consisting of a single reader and a plurality of tags, and solves the problem of tag collision caused when a plurality of tags communicate with the reader at the same time. The method adopts a stack structure and is simple to realize, and the tags to be identified only need to receive a command, and then returns corresponding data according to the parsed command. If it is a Query command, the query prefix (including Fpre and spre) in the command is compared with the own ID of the tag. If they are matched, the high K bit of the matched ID (the Wi segment mentioned above) is sent. If they are not matched, the reader's operation is not responded. If it is a QueryRep command, the Fpre in the command is compared with the own ID of the tag, if they are matched, the collision position indicated by the spre parameter is extracted, and the bit information of the position corresponding to the own ID of the tag is converted into the mapping data and is returned to the reader; if they are not matched, the reader's operation is not responded; if it is a QueryR command, the query prefix (including Fpre and spre) in the command is compared with the own ID of the tag. If they are matched, the high K bit of the matched ID (the Wi segment mentioned above) is sent. If they are not matched, the reader's operation is not responded; if it is a QueryG command, the query prefix (including Fpre and spree) in the command is compared with the own ID of the tag. If they are matched, the high K bit of the matched ID (the Wi segment mentioned above) are converted into $2^K$-bit mapping data and returned to the reader. If they are not matched, the reader's operation is not responded.

For those skilled in the art to understand and implement the technical scheme of the present disclosure, the disclosure scheme of the present disclosure is described in detail with specific embodiments:

Identification processes of seven tags are taken as examples. The IDs of seven tags are shown in FIG. 2, and the interaction process between the tags and the reader is shown in FIG. 3. In this embodiment, the ID length of tags is 12 bits, and the length of Wi segment is 4(K=4). According to the flow chart of the method shown in FIG. 1, the specific implementation steps are as follows:

step 1, the reader reads the frame prefix Fpre, the slot prefix spre and the flag bit flag from the stack, at this time, both Fpre and spre are empty strings ε, the flag bit is 0, and the reader sends a Query command in a slot 1;

step 2: at this time, all seven tags in the coverage area of the reader respond and send the high K bits of the matched ID (i.e. Wi segment) respectively;

step 3: the response received by the reader is "1111";

step 4: since the flag bit is 0 at this time, the reader first updates the Fpre to Fpre∥spre (still ε), and then parses the data segment Wi returned by the tag. The reader does not detect a collision in Wi, so updates the Fpre to Fpre∥Wi (the Fpre is updated to 1111 at this moment), and sets the query command flag to the Query command; and a skip is made to a step 5;

step 5: the reader judges that the length of the Fpre at this moment is not equal to the length of the tag ID, so a skip is made to the step 1 and resend an updated Query command in a slot 2; after going through the step 1 and the step 2 again, the reader receives a response "x01x" in the slot 2, where x indicates that the tag collides at this position; next, the reader updates the Fpre to the Fpre∥spre (still 1111) in step 4, and then a skip is made to a step 6;

step 6: the reader detects that there are 2 (m=2) bits of collision data in Wi, so this slot is immediately terminated, the collision position is recorded, the flag bit is set to 1, spre=Wi is updated (spre=x01x at this time), the query command flag is set to a QueryRep command, and a skip is made to step 5; after going through the step 5 and the step 1, the reader sends a QueryRep command in a slot 3; according to the above, the tag converts the bit information of the position corresponding to its ID into the mapping data and returns it to the reader. Where tag A returns 0010, tag B/C returns 0001, tags D/E/F/G all return 0100, and the response received by the reader is "0xxx"; since the flag is 1 at this time, a skip is made to a step 7;

step 7: the reader recovers original segment information $W^o$ according to the mapped data string returned by the received tag and the collision information in spre, the original segment information are 0011, 0010 and 1010 respectively, and it is judged that a length of $W^o$∥spre is not equal to a length of ID at this moment, so the reader updates spre=$W^o$ (at this time, spre1 is 0010, spre2 is 0011 and spre3 is 1010); the flag bit is set to 0, the query command flag is set to the QueryR command, and a skip is made to the step 1, and the reader sends the QueryR command in a slot 4; according to the above, the tag matches the query prefix (including Fpre and spre) in the command with its own ID, and sends the high K bits of the remaining ID; where tag B/C sends 0110 and 0111 respectively, tag A sends 1010, and tag D/E/F/G send 1011, 1100, 0110 and 1001 respectively; the responses received by the reader in slot 4 are "011x", "1010" and "xxxx"; since each tag has a unique ID, the reader may directly identify tag B and tag C after receiving "011x"; similarly, the reader may directly identify tag A after receiving "1010"; since all four tags match spre3, and the generated collision bit number is m=4, the reader immediately end this slot, the flag bit is set to 1, the query command flag is set to query command, and a skip is made to the step 1; the reader sends a QueryG command in a slot 5; according to the above, the tag compares the query prefix (including Fpre and spre) in the command with its own ID, and then converts the upper 4 bits of the matched remaining ID into 16-bit mapping data and returns it to the reader. The specific return data of tag D/E/F/G in this slot is shown in Table 3. According to the received response, the reader successfully identifies tags D, E, F and G; and step 8: the reader judges that the stack at this moment is empty, so the whole recognition process ends.

TABLE 3

| Responses of tags D/E/F/G to QueryG command | | | | | |
|---|---|---|---|---|---|
| Group query | | 0000 | 0001 | 1110 | 1111 |
| Tag D | 9-12 bits (1011) | 0000 | 0000 | 0000 | 0100 |
| Tag E | 9-12 bits (1100) | 0000 | 0000 | 0010 | 0000 |
| Tag F | 9-12 bits (0110) | 0000 | 0000 | 1000 | 0000 |
| Tag G | 9-12bits (1001) | 0000 | 1000 | 0000 | 0000 |
| The reader terminal receives the signal | | 0000 | x000 | x0x0 | 0x00 |

FIG. 4A, FIG. 4B, FIG. 4C, FIG. 5A, FIG. 5B, FIG. 5C, FIG. 5D, FIG. 6A, FIG. 6B, FIG. 6C and FIG. 6D show comparisons between the method of the present disclosure and the conventional classical anti-collision methods, and advantages of the present disclosure in the system efficiency, the total number of slots, the communication complexity (average transmission data required to identify a tag) and the total energy cost; where CT is a collision tree protocol, CwT is a collision window number protocol, MCT is a multi-level collision bit query tree protocol, MQT is a multi-level query tree protocol, and BQMT is a bit query multi-level tree protocol.

Figure 7:
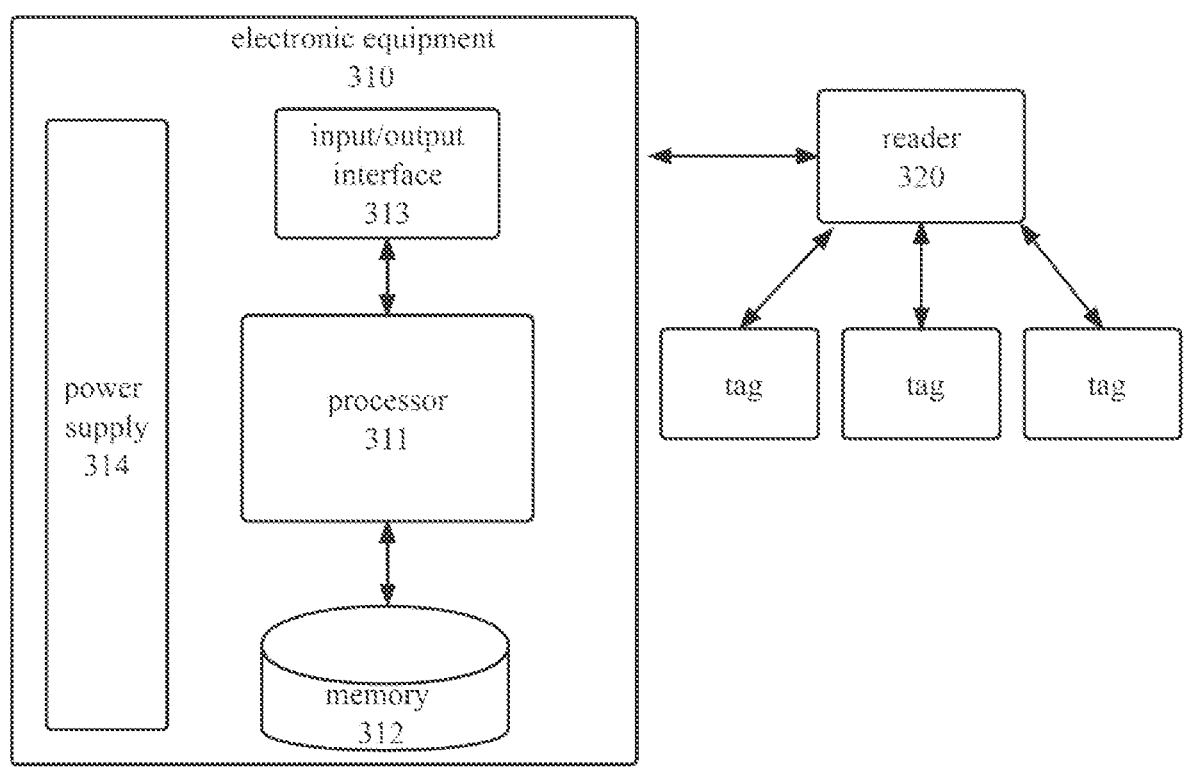
FIG. 7 shows a multi-tag concurrent identification system for a query tree based on feature groups according to an exemplary embodiment of the present disclosure.

FIG. 7 shows a multi-tag concurrent identification system for a query tree based on feature groups according to an exemplary embodiment of the present disclosure, which includes an electronic equipment 310 (such as a computer server with program execution function, a chip on a chip, etc.) and a reader 320; the reader is in communication connection with the electronic equipment 310 and used for sending or receiving information (such as sending broadcast commands, reading information in the tag, etc.) to the tags to be identified in a working area; the electronic equipment 310 includes at least one processor 311, a power supply 314, and a memory 312 and an input/output interface 313 in communication connection with the at least one processor 311. The memory 312 stores instructions executable by the at least one processor 311, and the instructions are executed by the at least one processor 311 to enable the at least one processor 311 to carry out the method disclosed in any of the foregoing embodiments; the input/output interface 313 may include a wired or wireless communication interface for connecting a reader, a display, a keyboard, a mouse, a USB and other devices to transmit data and signals. The power supply 314 is used to provide power for the electronic equipment 310.

It may be understood by those skilled in the art that all or part of the steps of the above-mentioned method embodiment may be completed by hardware related to program instructions, and the above-mentioned program can be stored in a computer-readable storage medium, and when the program is executed, it executes the steps including the above-mentioned method embodiment; the aforementioned storage media include various media that may store program codes, such as mobile storage devices, read only memories (ROM), magnetic disks or optical disks.

When the above-mentioned integrated units of the present disclosure are realized in the form of software functional units and sold or used as independent products, they may also be stored in a computer-readable storage medium. Based on this understanding, the technical scheme of the embodiment of the present disclosure may be embodied in the form of a software product, which is stored in a storage medium and includes several instructions to make a computer device (which may be a personal computer, a server, a network device, etc.) execute all or part of the methods described in various embodiments of the present disclosure. The aforementioned storage media include: mobile storage devices, ROM, magnetic disks or optical disks and other media that can store program codes.

The above is only a detailed description of the specific embodiments of the present disclosure, but not a limitation of the present disclosure. Various substitutions, modifications and improvements made by those skilled in the art without departing from the principles and scope of the disclosure should be included in the protection scope of the disclosure.

What is claimed is:

1. A multi-tag concurrent identification method for a query tree based on feature groups, comprising:
   dividing a whole data string space into a plurality of disjoint subsets according to features of data strings returned by tags, wherein each of the subsets contains several different data strings, each of the data strings in the each of the subsets is regarded as a complete tag ID or a partial ID, and the each of the subsets corresponds to a unique query prefix, and a length of the prefix is fixed and does not dynamically increase with an actual location of a collision, and when multiple data strings from a same subset return at a same time, a reader is capable of identifying them at a same time in a slot;
   wherein the method comprises following steps:
   step 1: the reader reads a frame prefix Fpre, a slot prefix spre and a flag bit flag from a stack, wherein both the frame prefix and the slot prefix are empty strings, and the flag bit is 0 in an initial state; and sends query commands of Query, QueryG, QueryR or QueryRep;
   step 2: a tag to be identified within a coverage area of the reader receives the query commands sent by the reader, compares the extracted frame prefix Fpre with an own number ID of the tag by using an own matching circuit, and responds to the query commands of the reader if matching, wherein response data depends on the flag bit flag, the slot prefix is spre and a command type; when the flag bit is 0, the tag matches first K bits of the own ID with the spre; if the matching result is true, the tag returns matched Wi segment data, otherwise waits for a next query command; when the flag bit is 1, the tag matches the own ID with the spre, and maps the collision data of m bits into mapping data of $M=2^m$ bits according to collision position indication information in the spre, wherein 1<k<m, and returns the mapping data to the reader; if m=K, the tag generates a $2^K$-bit data string and returns to the reader;
   step 3: the reader receives query responses from the tag; if tag responses are not received within a preset time period T, indicating that there is no tag to be identified within the coverage area of the reader; otherwise, a skip is made to a step 4;
   step 4, the reader analyzes corresponding tag data according to the different flag bits; if the flag bit is 0, the reader first updates the Fpre to Fpre∥spre, and then parses a segment Wi returned by the tag; if the reader does not detect a collision in Wi, updating the Fpre to Fpre||Wi, setting a query command flag to the Query command, and a skip is made to a step 5; otherwise, a skip is made to a step 6; if the flag bit is 1, a skip is made to a step 7;

step 5, the reader judges whether a length of Fpre at this moment is equal to a length L of the ID of the tag, and if equal, a current tag is successfully identified; if not equal, the reader pushes updated Fpre and spre parameters into the stack, and a skip is made to the step 1;

step 6: if only 1 bit of collision data in Wi is detected, the reader immediately terminates this slot and replaces the collision bit in Wi with 0 and 1 respectively, and then obtains Wi0 and Wi1; the reader updates Fpre=Fpre||spre, spre0=Wi0 and spre1=Wi1, and sets the query command flag to QueryR, and a skip is made to the step 5; if m bits of collision data are detected in Wi, wherein 1<m<K, the reader immediately terminates this slot, records a collision position, sets the flag bit to 1, updates Fpre=Fpre||spre, spre=Wi, sets the query command flag to the QueryRep command, and a skip is made to the step 5; if K bits of collision data are detected in Wi, the reader immediately terminates this slot, sets the flag bit to 1, sets the query command flag to the QueryG command, and a skip is made to the step 1;

step 7, the reader recovers original segment information $W^o$ according to a mapped data string returned by the received tag and the collision information in the spre, and judges whether a length of $W^o$||spre is equal to the length L of the ID of the tag; if equal, the reader is capable of identifying the corresponding tag; otherwise, the reader updates spre=$W^o$, sets the flag bit to 0, sets the query command flag to the QueryR command, and a skip is made to the step 1; and step 8: repeating the above steps until all tags are identified.

2. The multi-tag concurrent identification method for a query tree based on feature groups according to claim 1, wherein an ID coding of the tags adopts a Manchester coding or an FM0 coding.

3. The multi-tag concurrent identification method for a query tree based on feature groups according to claim 1, wherein in the step 1, the Query command is sent for a first time, and the command sent thereafter depends on the query command flag.

4. The multi-tag concurrent identification method for a query tree based on feature groups according to claim 3, wherein the method comprises: in case of the Query command, comparing the query prefix in the command with the own ID; if matching, sending a high K bit of the matched ID; if not matching, not responding to an operation of the reader.

5. The multi-tag concurrent identification method for a query tree based on feature groups according to claim 1, wherein in the step 2, a value of K is an integer power of 2.

6. The multi-tag concurrent identification method for a query tree based on feature groups according to claim 1, wherein in the step 2, when 1<m<k, mapping steps of the mapping data returned by the tag specifically comprises:

step 2.11, inputting m-bit original data, the data is represented as $b=b_{m-1}b_{m-2}\ldots b_0$ and mapped M-bit data is represented as $P=P_{M-1}P_{M-2}\ldots P_0$, wherein $M=2^m$, both $b_i$ and $P_i$ represent certain binary numbers; initializing to make $P_0$-bit in P as 1, rest bits as 0, and j as 0;

step 2.12, calculating $r=b_j \times 2^j$, circularly shifting P to the left by r bits to obtain an updated P, and executing j=j+1; and step 2.13: judging whether a value of j is equal to m, if yes, ending a mapping process and taking an output of P at this time as a final mapping data; otherwise, a skip is made to the step 2.12.

7. The multi-tag concurrent identification method for a query tree based on feature groups according to claim 1, wherein in the step 2, specific steps of the group query generation method comprise:

step 2.21: initializing a group query set $Q_{ini}$ and a K-dimensional vector space $S^K=\{0,1\}^K$, and vector lengths in the vector space are both K, $Q_{ini}$ is an empty set in the initial state;

step 2.22: randomly selecting a vector a0 from $S^K$;

step 2.23: selecting a vector a1 from $S^K$ to make a Hamming distance between a1 and a0 as 1;

step 2.24: pressing a0 and a1 into the set $Q_{ini}$ and removing them from $S^K$ at a same time;

step 2.25: judging whether a number of elements in the set $Q_{ini}$ exceeds N at this time, wherein $N=2^K/K$, if yes, ending a group query generation process and outputting $Q_{out}=Q_{ini}$, $Q_{out}$ is a finally generated group query set; if not, a skip is made to a step 2.26;

step 2.26: selecting a vector b0 from $S^K$ to make Hamming distances between each vector in the set $Q_{ini}$ and b0 greater than or equal to 3, and then a skip is made to a step 2.27;

step 2.27: selecting a vector b1 from $S^K$ to make a Hamming distance between b1 and b0 equal to 1; and step 2.28: pressing b0 and b1 into the set $Q_{ini}$ and removing them from $S^K$ at a same time, and a skip is made to the step 2.25.

8. The multi-tag concurrent identification method for a query tree based on feature groups according to claim 1, wherein in the step 2, when m=K, mapping steps of the mapping data returned by the tag specifically comprise:

step 2.31: K-bit original data is input, the data is represented as $b=b_{K-1}b_{K-2}\ldots b_0$, and mapped M-bit data is represented as $G=G_1G_2\ldots G_N$, wherein $M=2^K$, $N=2^K/K$, $b_i$ represents a certain binary number and $G_i$ represents a K-bit data string of the i-th segment in G; an initialization is performed to make G as an all-zero data string;

step 2.32: the tag matches the own ID with the spre in the query command, and performs an operation of bitwise XOR on a matched Wi data string and a corresponding group query to generate $G_i$; and step 2.33: the tag replaces a corresponding data string part in G with the generated $G_i$, and remaining data bits in G remain unchanged, and then returns to the reader.

9. A multi-tag concurrent identification system for a query tree based on feature groups, wherein the system comprises an electronic equipment and a reader;

the reader is in communication connection with the electronic equipment and used for transmitting or receiving information to tags to be identified in a working area; the electronic equipment comprises at least one processor and a memory in communication connection with the at least processor; the memory stores instructions executable by the at least one processor, and the instructions are executed by the at least one processor to enable the at least one processor to carry out a multi-tag concurrent identification method for a query tree based on feature groups, wherein the multi-tag concurrent identification method comprises:

dividing a whole data string space into a plurality of disjoint subsets according to features of data strings returned by tags, wherein each of the subsets contains several different data strings, each of the data strings in the each of the subsets is regarded as a complete tag ID or a partial ID, and the each of the subsets corresponds to a unique query prefix, and a length of the prefix is fixed and does not dynamically increase with an actual location of a collision, and when multiple data strings from a same subset return at a same time, a reader is capable of identifying them at a same time in a slot;

wherein the method comprises following steps:

step 1: the reader reads a frame prefix Fpre, a slot prefix spre and a flag bit flag from a stack, wherein both the frame prefix and the slot prefix are empty strings, and the flag bit is 0 in an initial state; and sends query commands of Query, QueryG, QueryR or QueryRep;

step 2: a tag to be identified within a coverage area of the reader receives the query commands sent by the reader, compares the extracted frame prefix Fpre with an own number ID of the tag by using an own matching circuit, and responds to the query commands of the reader if matching, wherein response data depends on the flag bit flag, the slot prefix is spre and a command type; when the flag bit is 0, the tag matches first K bits of the own ID with the spre; if the matching result is true, the tag returns matched Wi segment data, otherwise waits for a next query command; when the flag bit is 1, the tag matches the own ID with the spre, and maps the collision data of m bits into mapping data of $M=2^m$ bits according to collision position indication information in the spre, wherein $1<k<m$, and returns the mapping data to the reader; if m=K, the tag generates a $2^K$-bit data string and returns to the reader;

step 3: the reader receives query responses from the tag; if tag responses are not received within a preset time period T, indicating that there is no tag to be identified within the coverage area of the reader; otherwise, a skip is made to a step 4;

step 4, the reader analyzes corresponding tag data according to the different flag bits; if the flag bit is 0, the reader first updates the Fpre to Fpre∥spre, and then parses a segment Wi returned by the tag; if the reader does not detect a collision in Wi, updating the Fpre to Fpre∥Wi, setting a query command flag to the Query command, and a skip is made to a step 5; otherwise, a skip is made to a step 6; if the flag bit is 1, a skip is made to a step 7;

step 5, the reader judges whether a length of Fpre at this moment is equal to a length L of the ID of the tag, and if equal, a current tag is successfully identified; if not equal, the reader pushes updated Fpre and spre parameters into the stack, and a skip is made to the step 1;

step 6: if only 1 bit of collision data in Wi is detected, the reader immediately terminates this slot and replaces the collision bit in Wi with 0 and 1 respectively, and then obtains Wi0 and Wi1; the reader updates Fpre=Fpre∥spre, spre0=Wi0 and spre1=Wi1, and sets the query command flag to QueryR, and a skip is made to the step 5; if m bits of collision data are detected in Wi, wherein $1<m<K$, the reader immediately terminates this slot, records a collision position, sets the flag bit to 1, updates Fpre=Fpre∥spre, spre=Wi, sets the query command flag to the QueryRep command, and a skip is made to the step 5; if K bits of collision data are detected in Wi, the reader immediately terminates this slot, sets the flag bit to 1, sets the query command flag to the QueryG command, and a skip is made to the step 1;

step 7, the reader recovers original segment information $W^o$ according to a mapped data string returned by the received tag and the collision information in the spre, and judges whether a length of $W^o$∥spre is equal to the length L of the ID of the tag; if equal, the reader is capable of identifying the corresponding tag; otherwise, the reader updates spre=$W^o$, sets the flag bit to 0, sets the query command flag to the QueryR command, and a skip is made to the step 1; and step 8: repeating the above steps until all tags are identified.

* * * * *